(12) United States Patent
Theogaraj et al.

(10) Patent No.: US 11,134,126 B2
(45) Date of Patent: Sep. 28, 2021

(54) ADAPTIVE ROUTING OF BRANCH TRAFFIC IN SOFTWARE-DEFINED WIDE AREA NETWORK (SDWAN) DEPLOYMENTS

(71) Applicant: HEWLETT PACKARD ENTERPRISE DEVELOPMENT LP, Houston, TX (US)

(72) Inventors: Isaac Theogaraj, Bangalore (IN); Manjunatha GS, Bangalore (IN); Sivappirakasam Muthiah, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 190 days.

(21) Appl. No.: 16/294,388

(22) Filed: Mar. 6, 2019

(65) Prior Publication Data
US 2020/0287976 A1 Sep. 10, 2020

(51) Int. Cl.
*G06F 15/173* (2006.01)
*H04L 29/08* (2006.01)
*H04L 12/26* (2006.01)
*G06N 3/08* (2006.01)
*H04L 12/66* (2006.01)
*G06F 9/455* (2018.01)
*G06N 20/00* (2019.01)

(52) U.S. Cl.
CPC .......... *H04L 67/16* (2013.01); *G06F 9/45558* (2013.01); *G06N 3/08* (2013.01); *G06N 20/00* (2019.01); *H04L 12/66* (2013.01); *H04L 43/0864* (2013.01); *G06F 2009/45595* (2013.01)

(58) Field of Classification Search
CPC ..... H04L 67/16; H04L 12/66; H04L 43/0864; G06N 20/00; G06N 3/08; G06F 9/45558
See application file for complete search history.

(56) References Cited

U.S. PATENT DOCUMENTS

| 6,269,084 | B1 * | 7/2001 | Takei | H04L 43/0864 370/248 |
| 9,929,800 | B2 | 3/2018 | Anand et al. | |
| 2002/0026531 | A1 * | 2/2002 | Keane | H04L 12/4641 709/250 |
| 2002/0056008 | A1 * | 5/2002 | Keane | H04L 63/0272 709/245 |

(Continued)

OTHER PUBLICATIONS

Eskander et al (round trip time prediction) 2008 pp. 1-6 (Year: 2008).*

(Continued)

*Primary Examiner* — Razu A Miah
(74) *Attorney, Agent, or Firm* — McDermott Will & Emery

(57) ABSTRACT

A network orchestrator capable of selecting a primary virtual internet gateway (VIG) is provided. During operation, the network orchestrator can monitor roundtrip times for multiple packets between a primary VIG and a branch gateway, and between a secondary VIG and the branch gateway. The network orchestrator can determine a first forecast roundtrip time associated with the connection between the primary VIG and branch gateway, and a second forecast roundtrip time associated with the connection between the secondary VIG and the branch gateway. The network orchestrator can then select a new primary VIG based on the first and second forecast roundtrip times.

20 Claims, 8 Drawing Sheets

(56) References Cited

U.S. PATENT DOCUMENTS

| | | | | |
|---|---|---|---|---|
| 2006/0200543 | A1* | 9/2006 | Kong | H04L 12/66 709/223 |
| 2007/0230437 | A1* | 10/2007 | Schopf | H04L 47/70 370/352 |
| 2009/0063675 | A1* | 3/2009 | Faris | H04L 67/12 709/224 |
| 2012/0059934 | A1* | 3/2012 | Rafiq | H04L 67/1002 709/225 |
| 2012/0278477 | A1* | 11/2012 | Terrell | H04L 41/5009 709/224 |
| 2013/0204820 | A1* | 8/2013 | Hunzinger | G06N 3/08 706/25 |
| 2013/0238816 | A1* | 9/2013 | Skog | H04L 12/4625 709/245 |
| 2014/0098753 | A1* | 4/2014 | Kazmi | H04L 5/0091 370/329 |
| 2014/0280969 | A1 | 9/2014 | Wood et al. | |
| 2015/0195212 | A1* | 7/2015 | Vasseur | G06N 5/025 370/252 |
| 2015/0244617 | A1* | 8/2015 | Nakil | H04L 41/0631 709/224 |
| 2015/0254340 | A1* | 9/2015 | Walker | H04L 67/1097 709/219 |
| 2016/0142474 | A1* | 5/2016 | Itsumi | H04L 12/4625 370/390 |
| 2017/0111233 | A1* | 4/2017 | Kokkula | H04L 41/0823 |
| 2017/0347363 | A1* | 11/2017 | Roy | H04W 28/0268 |
| 2017/0353363 | A1* | 12/2017 | Parker | H04L 41/12 |
| 2018/0183855 | A1* | 6/2018 | Sabella | H04L 47/803 |
| 2018/0309681 | A1* | 10/2018 | Dahod | H04L 12/66 |
| 2019/0044949 | A1* | 2/2019 | Bartfai-Walcott | H04W 12/00506 |

OTHER PUBLICATIONS

Belhaj et al., "Modeling and Prediction of the Internet End-to-end Delay using Recurrent Neural Networks", Aug. 2009, Journal of Networks, vol. 4, No. 6, pp. 528-535.

Chen et al., "Dynamic Server Cluster Load Balancing in Virtualization Environment with OpenFlow", Research Article, Hindawi Publishing Corporation, International Journal of Distributed Sensor Networks vol. 2015, Article ID 531538, Sep. 8, 2014, pp. 1-9.

Hpe, "Aruba SD-branch", Sep. 13, 2018, available online at <https://web.archive.org/web/20180913075443/https://www.arubanetworks.com/solutions/sd-branch/>, 4 pages.

Hpe, "Aruba SD-WAN", Jul. 27, 2018, available online at <https://web.archive.org/web/20180727233720/https://www.arubanetworks.com/products/networking/sd-wan/>, 3 pages.

Wang et al., "Dynamic Adaptive Feedback of Load Balancing Strategy", Oct. 2011, Journal of Information & Computational Science, vol. 8, No. 10, pp. 1901-1908.

You et al., "Performance Evaluation of Dynamic Load Balancing Algorithms", Apr. 2014, Telkomnika Indonesian Journal of Electrical Engineering, vol. 12, No. 4, pp. 2850-2859.

Beijing University of Posts and Telecommunications Beijing China, an Adaptive Dynamic Feedback Load Balancing Algorithm Based on QoS in Distributed File System, Sep. 2017, pp. 1-7, Retrieved from the Internet on Oct. 15, 2018 from URL: <link.springer.com/article/10.1007/s41650-017-0029-3>.

Citrix Product Documentation, Active-active Site Deployment, Aug. 23, 2018, pp. 1-2, Retrieved from the Internet on Oct. 15, 2018 from URL: <docs.citrix.com/en-us/netscaler/12-1/global-server-load-balancing/deployment-types/active-active-site-deployment.html >.

College of Computer Science and Technology, Jilin University, Agent-based Dynamic Adaptive Cluster Load Balancing Model, Mar. 2014, pp. 1-11, Retrieved from the internet on Oct. 15, 2018 from URL:<iaescore.com/journals/index.php/IJEECS/article/download/3221/1364>.

Palestine Polytechnic University, Server Load Prediction Based on Dynamic Neural Networks, pp. 1-13, Retrieved from the Internet on Oct. 15, 2018 from URL: <researchgate.net/publication/266064454_Server_Load_Prediction_Based_on_Dynamic_Neural_Networks>.

Round Trip Time Prediction using the Symbolic Function Network Approach, Jul. 2008, pp. 1-6, Retrieved from the Internet on Oct. 15, 2018 from URL: <researchgate.net/publication/1738065_Round_Trip_Time_Prediction_Using_the_Symbolic_Function_Network_Approach>.

School of Information Science and Engineering, Lanzhou University, Dynamic Server Cluster Load Balancing in Virtualization Environment with Openflow, Aug. 8, 2014, pp. 1-9, >journals.sagepub.com/doi/pdf/10.1155/2015/531538>.

* cited by examiner

ADAPTIVE ROUTING OF BRANCH TRAFFIC IN SOFTWARE-DEFINED WIDE AREA NETWORK (SDWAN) DEPLOYMENTS

BACKGROUND

A wide area network (WAN) may extend across multiple network sites (e.g. geographical, logical). Sites of the WAN are interconnected so that devices at one site can access resources at another site. In some topologies, many services and resources are installed at core sites (e.g. datacenters, headquarters), and many branch sites (e.g. regional offices, retail stores) connect client devices (e.g. laptops, smartphones, internet of things devices) to the WAN. These types of topologies are often used by enterprises in establishing their corporate network.

Each network site has its own local area network (LAN) that is connected to the other LANs of the other sites of the WAN. Networking infrastructure, such as switches and routers, are used to forward network traffic through each of the LANs, through the WAN as a whole, and between the WAN and the Internet. Each network site's LAN is connected to the wider network (e.g. to the WAN, to the Internet) through a gateway router. Branch gateways (BGs) connect branch sites to the wider network, and virtual internet gateways (VIGs, also known as head-end gateways) connect core sites to the wider network.

Often, WANs are implemented using software defined wide area network (SD-WAN) technology. SD-WAN decouples (logically or physically) the control aspects of switching and routing from the physical routing of the network traffic. In some SD-WAN implementations, each gateway (BGs and VIGs) controls certain aspects of routing for their respective LAN, but a network orchestrator controls the overall switching and routing across the WAN. In some other SD-WAN implementations, the network orchestrator controls all switching and routing in the WAN and in each LAN by sending control messages to compatible network infrastructure devices (including the BGs and VIGs) across the WAN.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
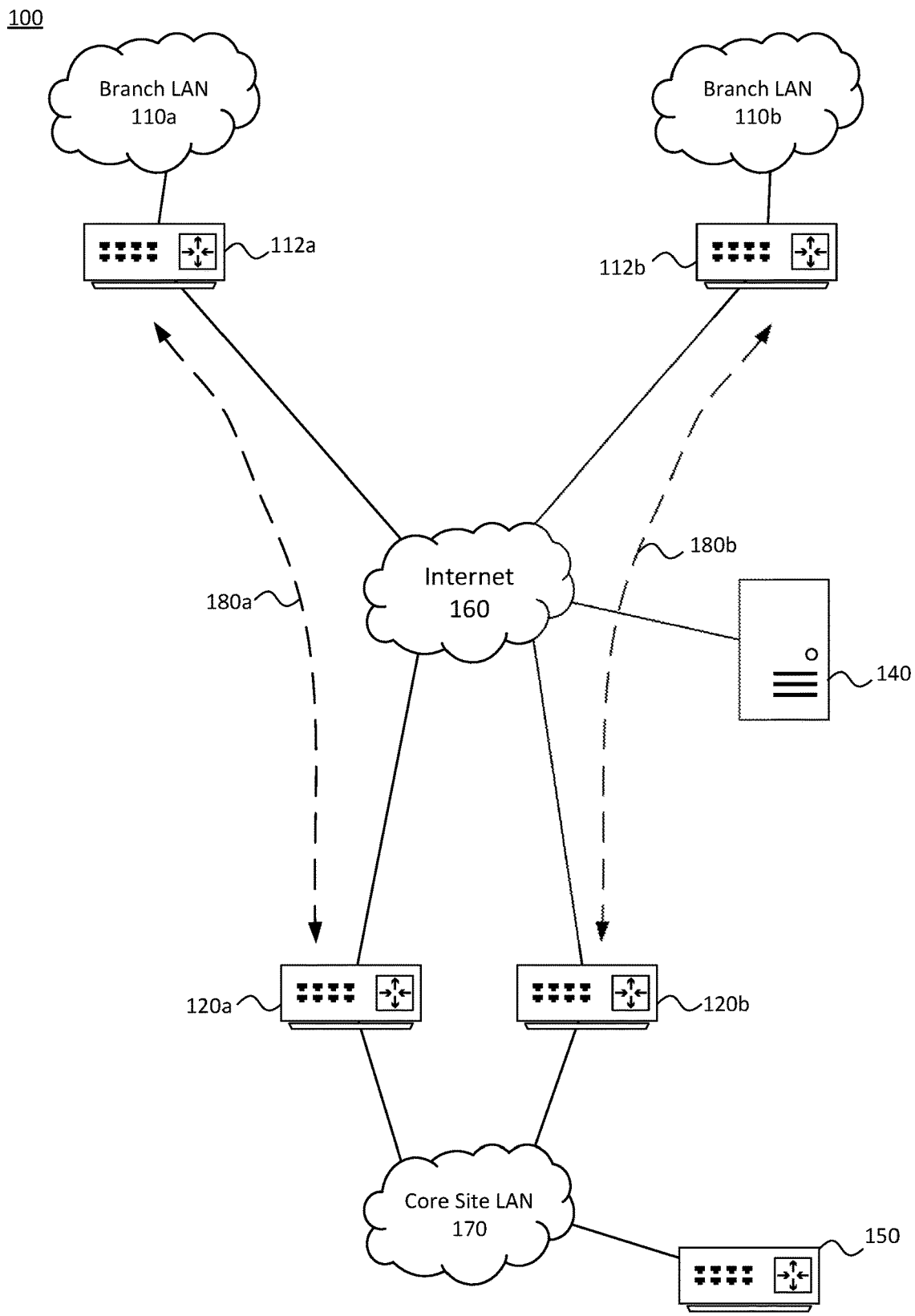
FIG. 1 illustrates an example network that may employ principles of the present disclosure, according to one or more embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

In a Software-Defined Wide Area Network (SDWAN) configuration, branch gateways (BGs) connect to virtual internet gateways (VIGs) via one or more secure connections. These connections may be dedicated links such as multiprotocol label switching (MPLS) links, or they may be shared links such as secure virtual private networking (VPN) tunnels across the Internet. Multiple connections may be made between a certain BG and a certain VIG to provide redundancy in case of link failure (among other benefits). Similarly, a site may include multiple gateways to provide redundancy in case one of the gateways fails. Certain branch sites may be small enough that a single BG is used because failure of the BG would not impact the operation of the WAN enough to warrant a redundant BG. However, in comparison, it is much more likely that VIG failure at a core site of the WAN would have a large impact on the operation of the WAN. VIG redundancy is common in most large WANs.

In many current WANs, the redundant VIGs at a core site are configured in an "active-standby" mode, where one or more VIGs are actively transceiving data, and one or more VIGs are idly standing by, waiting for a failover condition if one or more active VIGs fail. Network infrastructure in the core site LAN, such as a core router in an OSPF backbone, as well as gateways in other sites, such as BGs at each branch, are configured to route their data through the active VIG (also known as the primary VIG) and retain the information of the standby VIG (also known as the secondary VIG) in case their connection to the primary VIG fails.

Core site LANs may be configured in a network topology that includes a network backbone and other network zones. One such example routing paradigm is open shortest path first (OSPF). In some WAN networks, the routing paradigm used in the core site LANs is not used across the larger WAN or in other (e.g. branch) site LANs.

The WAN may include a network orchestrator to configure switching and routing across the WAN. In some examples, the network orchestrator operates in a core site of the WAN. In some other examples, the network orchestrator operates in the cloud. The network orchestrator may communicate with command layers of each of the gateways as well as other switching and routing infrastructure throughout the WAN. The network orchestrator cannot communicate with the command layers of network infrastructure outside the WAN that is being used to forward network traffic between sites of the WAN (i.e. Internet routers and switches that are not controlled by the administrator of the WAN). The network orchestrator creates and deploys routes for certain network traffic to follow. For example, data from a resource in a core site that is destined for a client device on a branch site may be routed through the core site LAN to a primary VIG, through a secure tunnel across the Internet to a BG at the branch site, and through the branch site LAN to the client device.

One of the benefits of a SD-WAN system is that alterations to the network topology can be implemented with reduced manual configuration from the network administrator. For example, when a branch gateway joins the network, the branch gateway can be automatically assigned a primary VIG and a secondary VIG by the network orchestrator. In many current WAN topologies, a single primary VIG is statically assigned for all branches and a single secondary VIG is statically assigned for all branches. The primary VIG transceiver all relevant network traffic, and the secondary VIG is idle until and unless the primary VIG or connections between a BG and the primary VIG fail.

Embodiments as disclosed herein provide a network orchestrator that can be configured to dynamically assign VIGs to branch gateways, and that can further predictively assess potential traffic constraints and pre-emptively re-assign VIGs accordingly. VIGs are operated in an "active-active" mode, and the network orchestrator adjusts the load on each VIG so that any one of the VIGs is not overloaded. As network topology and conditions evolve, the network orchestrator intelligently adjusts assignments of BGs and VIGs to accommodate the changing network.

The network orchestrator may re-configure devices and systems of the SD-WAN according to different, custom needs arising in any given network location, even before a problem arises. For example, a predictive algorithm may be used by the network orchestrator to determine roundtrip time values between combinations of BGs and VIGs to re-assign VIGs to BGs to improve network functionality.

There is a technical problem in many current SD-WANs in that network conditions affecting the connection between VIGs and the branch LANs of the SD-WAN (including factors such as round-trip time, latency, jitter, dropped packets, etc.) are not considered when assigning a primary VIG at a core site LAN. Even in SD-WANs where primary VIGs and secondary VIGs are assigned on a per-branch basis, there is no mechanism in place to detect and update those assignments when network conditions change or degrade.

Embodiments as disclosed herein solve the above technical problem arising in computer network technology by continually monitoring the network traffic to train a predictive tool that enables the assessment of potential future network conditions. This approach provides enhanced network traffic load-balancing between sites of an SD-WAN in a way that reduces adverse data traffic behaviors, such as high latency, high jitter, poor quality of service (QoS), etc. Embodiments as disclosed herein include the technical solution of predicting a load condition of each VIG of the core site LAN and periodically reassigning BGs to between the VIGs to more optimally balance the load between the VIGs. Accordingly, embodiments as disclosed herein enable network traffic to be dynamically routed by predicting the load condition of the VIGs and reassigning a BG to a less loaded VIG to reduce load on a congested VIG and to balance the overall network traffic load.

The network orchestrator may collect a roundtrip time (RTT) for a diagnostic packet travelling between a BG and its primary VIG and a RTT for another diagnostic packet travelling between the BG and its secondary VIG. Using those RTTs, along with other network condition data, the network orchestrator may determine that the BG should have a different primary VIG assigned and a different secondary VIG assigned. The network orchestrator may also monitor, over a selected period of time, multiple RTTs for multiple diagnostic packets between the primary VIG and the BG, and between the secondary VIG and the BG in order to identify any recurrent patterns within the RTTs associated with the BG. Based on detected recurrent patterns, the network orchestrator may forecast a potential future RTT for a packet transmitted between the BG and the primary VIG, and forecast a potential future RTT for a packet transmitted between the BG and the secondary VIG. Using those forecast RTTs, the network orchestrator may determine that the BG should be assigned a new primary VIG and a new secondary VIG. Although this disclosure is primarily focused on RTTs to be used by the network orchestrator to make VIG assignment decisions, it is contemplated that any appropriate connection health metric or combination of metrics could be used to make VIG assignment decisions. Also, although the SD-WANs described in this disclosure have certain numbers of VIGs, BGs, branch LANs, core site LANs, etc., it is contemplated that any appropriate number of such components could be used in a SD-WAN and still be consistent with this disclosure.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

FIG. 1 illustrates an example software defined wide area network (SD-WAN) including a core site local area network (LAN) 170 and branch LANs (represented in FIG. 1 by branch gateways 110-1 to 110-n). SD-WAN 100 may be a corporate network, an institutional intranet, or any other sufficiently complex managed computer network. SD-WAN 100 includes multiple LANs, partitioned geographically (e.g. various office sites of the organization), functional (e.g. groups with special security or bandwidth needs), or logical (e.g. sections or regions of a large campus, such as a headquarters). A person having ordinary skill in the art will have knowledge of the various reasons and methods for partitioning a SD-WAN into LANs.

SD-WAN 100 includes branch LANs 110a and 110b, and core site LAN 170. SD-WAN 100 is administered by network orchestrator 140 which is connected to the sites of SD-WAN 100 through Internet 160. Sites (e.g. branch LANs 110, core site LAN 170) of SD-WAN 100 are communicatively coupled through Internet 160. The communication links between the sites of SD-WAN 100 may be connected by one or more networking technology, including secure tunnels across Internet connections (e.g. IPSec VPNs), dedicated communication links (e.g. MPLS), or any other appropriate technology.

Core site LAN 170 is a network site of SD-WAN 100 that includes network resources to provide services and applications to network client devices. Although branch LANs 110 may include network resources to provide services and applications (e.g. edge computing), a core site LAN 170 includes a concentrated number of network resources accessible to sites across SD-WAN 100. In some examples, core site LAN 170 is a headquarters site or a datacenter site. Core site LAN 170 includes a core router 150 to route packets within core site LAN 170. In some examples, multiple network infrastructure devices (e.g. switches, routers) are interconnected to route packets within core site LAN 170. All features of this disclosure described in relation to core router 150 may be applicable to all network infrastructure devices of core site LAN 170, as appropriate. Core site LAN 170 also includes virtual internet gateways (VIGs) 120a and 120b. VIGs (also known as headend gateways) connect core site LAN 170 to the wider network (e.g. Internet 160, SD-WAN 100). VIGs 120a and 120b establish connections with one or more branch LANs 110, respectively.

Branch LANs 110 are sites of SD-WAN 100 that are partitioned from core site LAN 170. As mentioned herein, Branch LANs 110 may be partitioned for many reasons, including geographical distance, functional difference, or logical separation. In some examples, branch LANs 110 are satellite offices, retail storefronts, or other remote facilities of an organization. Branch LANs 110 may include wired and wireless devices such as point of sale devices, internet of things devices, employee wired and wireless computing devices, etc. Certain data from branch LANs 110 may have a destination of core site LAN 170, another branch LAN 110, or Internet 160. Depending on the specific topology of SD-WAN 100, such data may be routed in one of a variety of ways that would be clear to a person having ordinary skill in the art. One example includes routing all data packets through core site LAN 170 before they reach their destination in order to perform certain network functions (e.g. firewall, analytics) using resources of core site LAN 170. Branch LANs 110 are connected to the wider network (e.g. Internet 160, SD-WAN 100) through branch gateways 112. Branch gateways 112 establish connections with core site LAN 170 through VIGs 120a and 120b. Each branch gateway 112 may establish multiple connections with core site LAN 170.

Although FIG. 1 illustrates a single core site LAN 170 and two branch LANs 110, this is only a simple example of a topology of SD-WAN 100 used for clarity of the concepts herein. It would be clear to a person having ordinary skill in the art that SD-WAN 100 could be configured in one of many different topologies, including topologies with any number of core site LANs 170, any number of VIGs 120a and 120b, any number of branch LANs 110, any number of branch gateways 112, any number of connection links, etc.

Network orchestrator 140 controls routing of packets throughout SD-WAN 100. Network orchestrator 140 connects to VIGs 120a and 120b, and branch gateways 112 to control the routing of packets that pass through each respective gateway. In some examples, network orchestrator 140 is executed on a cloud device. In some other examples, network orchestrator 140 is executed on a server device of core site LAN 170. In yet other examples, network orchestrator 140 is executed on a controller device of core site LAN 170. Network orchestrator 140 may be located in any appropriate network location and executed in any appropriate manner consistent with the operation of SD-WAN 100. Network orchestrator 140 sends routing flow information to VIGs 120a and 120b and to branch gateways 112 to modify the gateways' operation. In some examples, network orchestrator 140 sends the routing flow information through out-of-band control links between network orchestrator 140 and the respective gateway. In some other examples, network orchestrator 140 sends the routing flow information through in-band data links between network orchestrator 140 and the respective gateway. In certain examples, the routing flow information includes information about routing data within core site LAN 170 and/or branch LANs 110. In certain such examples, the respective gateway for each affected LAN may forward relevant portions of the routing flow information to LAN controllers (not shown) in the respective LAN. In certain other such examples, network orchestrator 140 may forward the routing flow information to the network infrastructure devices of each affected LAN, such as core router 150. In yet other such examples, network orchestrator 140 may forward the routing flow information to the respective gateway for each affected LAN, and LAN controllers for each respective LAN calculate LAN routing rules in accordance with the routing flow information from network orchestrator 140. A person having ordinary skill in the art will recognize that there are many methods for disseminating routing flow information across SD-WAN 100 within the spirit and scope of this disclosure.

Internet 160 represents multiple links that connect sites of SD-WAN 100 via one or more technologies and via one or more service providers. Internet 160 is not fully controlled or administered by the administrator of SD-WAN 100. Due to the public and uncontrolled nature of Internet 160, example implementations of SD-WAN 100 use secure tunnels between sites or dedicated links between sites to improve security and reliability of SD-WAN 100.

Branch Initialization

In an example operation of SD-WAN 100, during initialization of branch LAN 110a, branch LAN 110a is connected to core site LAN 170 by assigning VIG 120A as a primary VIG for branch gateway 112a. With VIG 120A as the primary VIG for branch LAN 110a, packets exchanged between core site LAN 170 and branch LAN 110a follow route 180a through VIG 120A and branch gateway 112a. Network orchestrator 140 may gather network information regarding SD-WAN 100, including topology information, device load information, and number of branches assigned to each VIG to determine which VIG to assign to currently initializing branch LAN 110a. For example, if eight of the previously existing ten branches are all assigned VIG 120B as primary VIG, network orchestrator 140 may assign branch LAN 110a to VIG 120A to reduce the skew of assigned branches between VIG 120A and VIG 120B. Although there are many ways to assign VIG 120A as primary VIG to branch LAN 110a, in one common method, network orchestrator 140 transmits a network flow route to branch gateway 112a that routes all traffic with a destination in core site LAN 170 through a communication link that terminates at VIG 120A. In such a method, network orchestrator 140 also transmits a network flow route to VIG 120A that routes all traffic with a destination of branch LAN 110a through a communication link that terminates at branch gateway 112a. In some examples, network orchestrator 140 transmits a network flow route to core router 150 so that data traffic within core site LAN 170 and with a destination of a device on branch LAN 110a is directed to VIG 120A in order to be forwarded across route 180a.

In further description of the example operation of SD-WAN 100 from the preceding paragraph, during initialization of branch LAN 110b, branch LAN 110b is connected to core site LAN 170 by assigning VIG 120B as a primary VIG for branch gateway 112b. With VIG 120B as the primary VIG for branch LAN 110b, packets exchanged between core site LAN 180 and branch LAN 110b follow route 180b through VIG 120B and branch gateway 112b. Using gathered information from across SD-WAN 100, network orchestrator 140 determines that it is beneficial to assign VIG 120B as the primary VIG for branch LAN 110b. For example, if branch LAN 110a is the only pre-existing branch on SD-WAN 100 and branch LAN 110a has VIG 120A assigned as the primary VIG, network orchestrator 140 may detect that the load on VIG 120B (which has no branches assigned) is less than the load on VIG 120A (which has branch LAN 110a assigned), and thus assign VIG 120B as the primary VIG for branch LAN 110b.

In some examples, branch gateways 112 each establish multiple uplinks to core site LAN 170. These multiple uplinks may include multiple logical connections originating from the same physical port on the respective branch gateway 112 and multiple physical connections each originating from separate physical ports on the respective branch gateway 112. In such examples, network orchestrator 140 assigns a secondary VIG to each respective branch gateway 112. In an SD-WAN 100 where VIG 120A is primary VIG to branch LAN 110a and VIG 120B is primary VIG to branch LAN 110b, network orchestrator 140 may assign VIG 120B as secondary VIG to branch LAN 110a and may assign VIG 120A as secondary VIG to branch LAN 110b. In a situation where a connection is severed between a branch LAN 100 and a primary VIG, data can still be transacted between the branch LAN and the core site LAN via the secondary VIG. It is important to recognize that the assignment of primary and secondary VIGs to a branch LAN may not be the only form of protection in place to protect the connection between the branch LAN and the core site LAN. Other redundancies and failover routes may be in place for situations where links between the branch gateway 112 and the primary and secondary VIGs are severed. In some examples, branch LANs 110a-b may load balance their WAN connections across multiple uplinks from branch gateways 112a-b, and across redundant branch gateways 112 (not shown) in each branch LAN 110. In such examples, primary and secondary VIGs may be assigned on a per-branch gateway or per-uplink basis.

Network orchestrator 140 dynamic adapts routing paths between branch gateways 110 and VIGs 120a and 120b as new branches are added to the networks. Network orchestrator 140 collects and analyzes data from SD-WAN 100 to make a VIG assignment determination dynamically when each new branch is added to the network. In some examples, rather than just take a snapshot of contemporaneous network conditions, network orchestrator 140 may incorporate operating history information and network topology information into an algorithm to determine which VIG to assign to the new branch as primary VIG. In some examples, network orchestrator 140 may, at the time when a new branch is added, re-shuffle the assignments of primary VIGs for previously added branches to more properly balance the load between VIGs.

VIGs 120a and 120b collect load information. Based on the load information provided to network orchestrator 140 from each VIG, the network orchestrator 140 may dynamically assign each new branch a primary VIG with the most available capacity. Each VIG may collect networking load information including operating capacity (operating below capacity, at capacity, or above capacity), operating performances (operating performance is below a critical value, at a critical value, or above a critical value), operational efficacy, and the like. In some embodiments, the VIGs may collect system load information, including computing processing unit (CPU) utilization, a memory utilization, a data throughput, and a data latency, and the like, of the VIG. Measurement points of load information may be collected periodically (e.g., every three minutes), continuously, on interrupt (e.g. counting each time CPU usage spikes above 85%), or in any other appropriate manner.

The load information for a certain VIG 120A or 120b is used to calculate a load factor for the VIG. In some examples, the VIG 120A or 120b calculates the load factor and forwards the load factor to network orchestrator 140. In some other examples, the VIG 120A or 120b forwards the load information to network orchestrator 140 and network orchestrator 140 calculates the load factor for the VIG 120A or 120b. As an example, load factor may be calculated by the following equation:

$$\text{Load Factor}(LF) = (\tfrac{1}{3})\text{CPU load}(\%) + (\tfrac{1}{3})\text{memory usage}(\%) + (\tfrac{1}{3})\text{data throughput}(\%) \quad \text{Equation (1)}$$

In some examples, load factor for a certain VIG 120A or 120b may be calculated at the time that load information for the VIG 120A or 120b is collected. For example, if load information is collected at five minute intervals, load factor for VIG 120A or 120b may be calculated at the same five minute intervals. In some other examples, load factor for VIG 120A or 120b may be calculated independent of the load information collection interval. For example, load information may be collected at five minute intervals, but load factor is calculated on demand when a new branch is added to the network. It will be clear to a person having ordinary skill in the art that any regime of intervals for calculating load factor, whether it be repetitive or ad-hoc, is consistent with this disclosure.

Dependent on the specific functionality of the network, VIGs 120a and 120b may communicate either their load factors or load information to the network orchestrator 140. VIGs 120a and 120b may communicate the load factors or load information at an interval or in an ad-hoc manner as requested by network orchestrator 140. In an example, VIGs 120a and 120b may communicate the load factors to the network orchestrator 140 at time intervals of every five minutes. The time interval is not limited in this regard, and embodiments disclosed are equally applicable to a network that includes a time interval of less than or more than five minutes, as well as to repetition that is ad-hoc, interrupt-based, or triggered by any other appropriate event transpiring.

Figure 8:
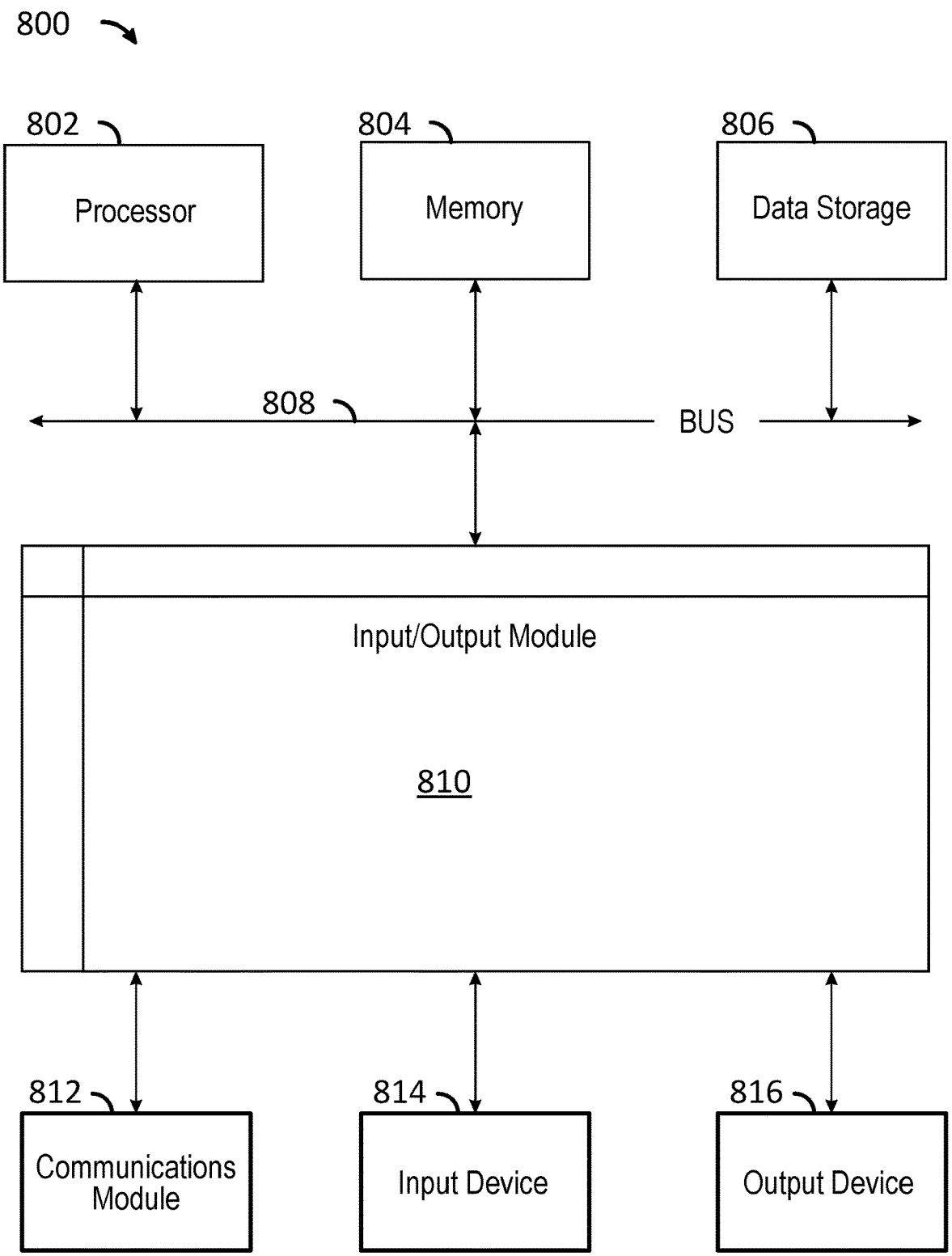
FIG. 8 is a block diagram illustrating an example computer system with which the client and network device of FIG. 1 and the methods of FIGS. 5 and 7 can be implemented.

The network orchestrator 140 may be implemented by one or more computing devices or systems in some embodiments, such as a computing system 800 described in FIG. 8. The network orchestrator 140 may also be provided as a service from a cloud provider or a WAN provider. In some examples, network orchestrator 140 may be located in core site LAN 170. The network orchestrator 140 obtains the load factors of VIGs 120a and 120b. In some examples, network orchestrator 140 receives load information from each of the VIGs and computes a load factor for the respective VIG based on the load information. In other examples, network orchestrator 140 receives calculated load factors from each respective VIG.

The network orchestrator 140 then assigns one the VIGs as a primary VIG for a branch gateway of a newly added branch, and another VIG as a secondary VIG for the branch gateway of the newly added branch LAN. In some embodiments, the network orchestrator 140 performs the VIG assignments at the time when the branch LAN joins SD-WAN 100. For example, branch gateway 112a may, when initially configured during setup of branch LAN 110a, establish a secure tunnel with network orchestrator 140 through Internet 160. Network orchestrator 140 (or other initialization services co-located with network orchestrator 140) may transmit configuration information through the tunnel to branch gateway 112a. This configuration information may include a primary VIG assignment and a secondary VIG assignment. Network orchestrator 140 may determine which VIG 120A or 120b to assign to branch LAN 110a based on load information and/or load factors previously (or concurrently) obtained from VIGs 120a and 120b, as well as the primary VIG and secondary VIG assignments for already initialized branch 110b.

Network orchestrator 140 may assign primary VIG and secondary VIG for a branch by transmitting routes to the relevant branch gateway and to the relevant VIGs that accomplish the behavior of having LAN traffic prefer to pass through the proper WAN uplink to pass between the primary VIG and the branch gateway. For example, network orchestrator 140 may send a command (e.g. a flow) to branch gateway 112a that directs branch gateway 112a to forward all traffic with IP addresses allocated to core site LAN 170 through the uplink connection terminating at VIG 120A. The command from network orchestrator 140 may, in some examples, direct branch gateway 112a to forward packets destined for certain subnets (e.g. subnets associated with core site LAN 170) through a specific port of branch gateway 112a that is the port terminating the connection with VIG 120A. For example, network orchestrator 140 may also send commands to VIG 120A and VIG 120B that adjust the open shortest path first (OSPF) redistribution cost for VIG 120A to be less than the OSPF redistribution cost for VIG 120B for certain subnets (e.g. subnets associated with branch LAN 110a). VIGs 120a and 120b may then transmit a routing update message to core site LAN 170 including the adjusted redistribution costs. Resultantly, core router 150, which is an OSPF neighbor of VIG 120A and VIG 120B, will prefer to route packets with destination IP addresses within a range associated with branch LAN 110a through VIG 120A. If issues arise with the connection between branch gateway 112a and VIG 120A, core router 150 and the other routing infrastructure of core site LAN 170 will fall back to using VIG 120B to transmit packets to branch LAN 110a.

Although the assignment of VIGs to a new branch has been described in relation to load factors, in some examples network orchestrator 140 may establish thresholds within which load factors are used to determine assignment of VIGs. Outside of the thresholds, network orchestrator 140 may use a different method for assignment of VIGs. For example, network orchestrator 140 may determine a skew between a number of branch LANs 110 connected to each VIG 120A and 120b. When the determined skew is more than a threshold (e.g., 50%), the network orchestrator 140 relies on the numbers of previously existing branch LANs 110 assigned to each VIG to assign a primary VIG and a secondary VIG to a newly initialized branch LAN 110a. For example, if seven branch LANs 110 have VIG 120A assigned as primary VIG, and two branch LANs 110 have VIG 120B assigned as primary VIG, since the determined skew (seven branches versus two branches is a skew of five branches) is more than 50% of the total number of branches (nine total branches), the network orchestrator 140 assigns VIG 120B as primary VIG for newly initialized branch LAN 110a. In other words, when the determined skew is less than a threshold, the network orchestrator 140 assigns VIGs to branches based on the load factors and when the determined skew is greater than the threshold, network orchestrator 140 assigns VIGs to branches in a manner that reduces the skew.

Dynamic Adaptive Routing

As conditions of SD-WAN 100 change over time, an initial assignment of VIG 120 to BG 112 may no longer be most effective. Network orchestrator 140 is programmed to regularly obtain operational information of SD-WAN 100. The operational information may include network functionality (e.g. latency, roundtrip time, jitter) metrics as well as device load metrics (e.g. load factors, load information). In an example, network orchestrator 140 is communicates with VIGs 120 to obtain a time-series collection of roundtrip time (RTT) values collected for multiple diagnostic packets over a selected period of time.

As described above, network orchestrator 140 may initially select a VIG 120a to assign as a primary VIG for a new BG 112a. Network orchestrator 140 may also initially select another VIG 120b as a secondary VIG for the new BG 112a. However, after a certain period of time, network orchestrator 140 may determine, based on RTTs for diagnostic packets travelling between BG 112a and the primary and secondary VIGs, that traffic from branch LAN 110a (through BG 112a) is more efficiently routed in a different way. Network orchestrator 140 may then reassign a new primary VIG and a new secondary VIG for BG 112a to more efficiently route traffic between branch LAN 110a and core site LAN 170. In some embodiments, VIGs 120 are configured to monitor, over a selected period of time, RTTs for multiple diagnostic packets sent between VIGs 120 and BGs 112.

The RTT values measured by the VIGs 120 are provided to network orchestrator 140 (e.g., in the form of time-series data) which may, when analyzed by a machine learning algorithm, be used to forecast a possible future RTT value for each respective VIG 120. Network orchestrator 140 may include a machine learning algorithm, such as a nonlinear algorithm such as a neural network or a deep learning algorithm, or an artificial intelligence application in order to forecast the possible future RTT values. Based on the forecast RTT values, network orchestrator 140 may determine that a new primary VIG 120 will improve network performance for a given BG 112.

For example, when a forecast RTT value between VIG 120b and BG 112a is lower than a forecast RTT value between VIG 120a and BG 112a, then network orchestrator 140 may reassign the primary VIG for BG 112a to be VIG 120b. Further, in some embodiments, network orchestrator 140 may use a skew of active branch gateways in the primary VIG and the secondary VIG to determine whether to reassign primary/secondary VIG designations for each active BG 112.

As described above in relation to the initial assignment of VIGs to a new BG, core site router 180 routes network traffic in core site LAN 170 based on redistribution costs, such as OSPF redistribution costs. As network orchestrator 140 reassigns primary and secondary VIGs for a BG, network orchestrator 140 also updates redistribution costs for each VIG relative to the BG such that core site router 180 (and other infrastructure devices of core site LAN 170) prefers to send traffic destined to subnets in the respective branch LAN through the new primary VIG.

Figure 2:
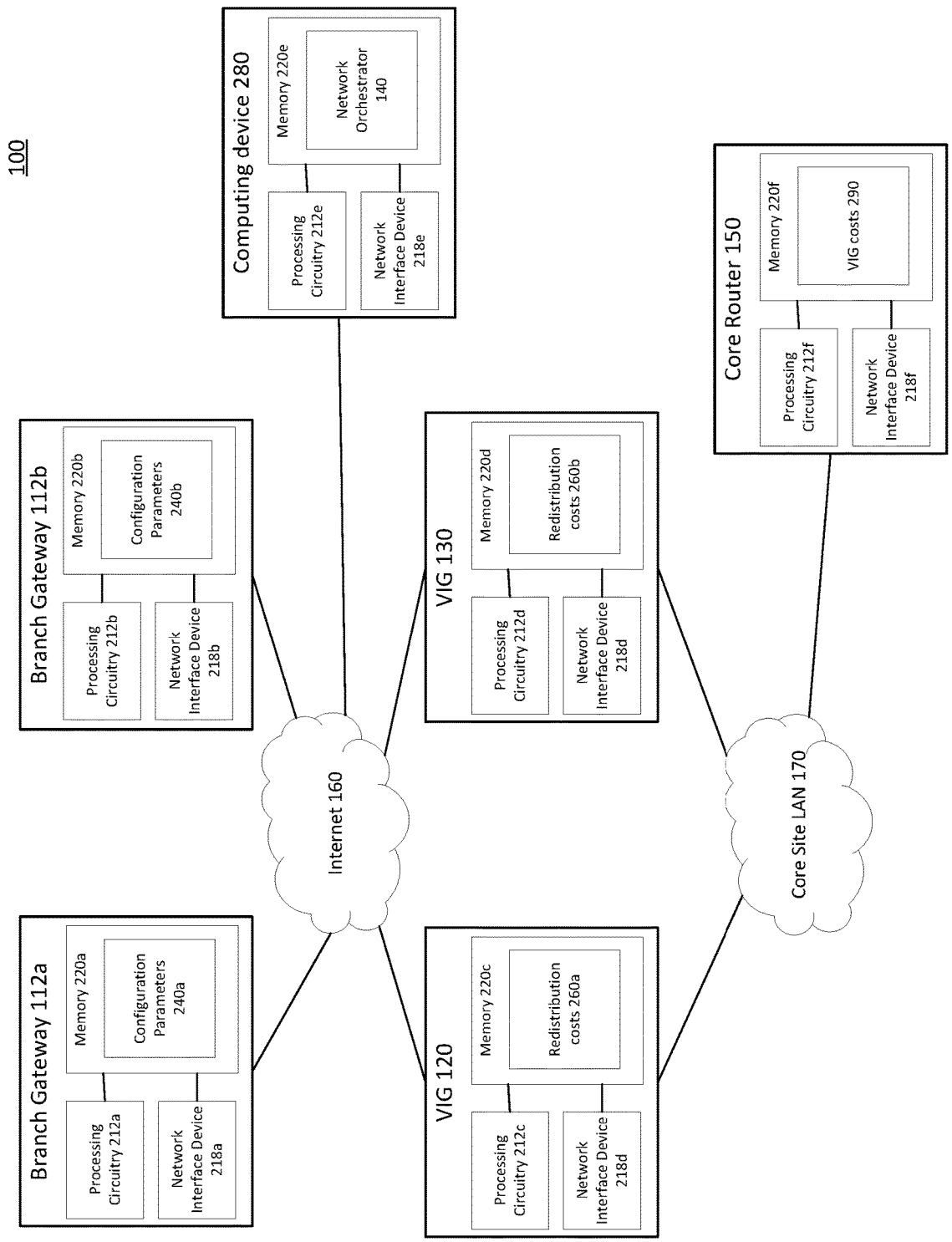
FIG. 2 is a detailed view of some of the hardware components in the network of FIG. 1, according to some embodiments.

FIG. 2 is a detailed view of some of the hardware components in SD-WAN 100, according to some embodiments. The core router 150 is coupled to VIGs 120 through core site LAN 170. The network orchestrator 140 is executed on computing device 280, which, in the examples of FIG. 2, is a cloud device. VIGs 120 are coupled to computing device 280 and to branch gateways 112 via Internet 160.

In examples consistent with FIG. 2, each device (branch gateways 112a-b, VIGs 120a-b, core router 150, computing device 280) includes processing circuitry 212, a network interface device 218, and memory 220. Each device may operate in a common manner of processing circuitry 212 retrieving instructions from memory 220 and executing those instructions. Certain instructions in each respective memory 220 may, when executed by processing circuitry 212, access data stored in memory 220 or in other storage (not shown). Certain instructions in each respective memory 220, when executed by processing circuitry 212, may utilize network interface device 218 to transceive data across a network.

Processing circuitries 220 may be any appropriate processing circuitry, including one or more CPUs, ASICs, FPGAs, microcontrollers, SoCs, virtualized processors, etc. Network interface devices 218 may be any appropriate devices, circuitry, or components (e.g. NICs, wireless antennae, modems, Ethernet cards, virtualized network interfaces) that are configured to interface with other devices of SD-WAN 100 to send and receive information, such as data packets, requests, responses, and commands. Memories 220 may include system memory (e.g. processor cache, RAM, ROM, etc.) as well as storage (e.g. HDD, SSD, NAS, etc.) and virtualized memory and storage that can store instructions and data.

Branch gateways 112 may store configuration parameters 240 in memories 220. Configuration parameters 240 may include reference to assigned VIGs, such as a primary VIG and a secondary VIG. For example, branch gateway 112a may include a configuration parameter 240a referencing VIG 120 as a primary VIG and another configuration parameter 240a referencing VIG 130 as a secondary VIG. Similarly, branch gateway 112b may include a configuration parameter 240b referencing VIG 130 as a primary VIG and another configuration parameter 240b referencing VIG 120a as a secondary VIG.

VIG 120a and VIG 120b may store redistribution costs 260 in memories 220. Redistribution costs 260 may include reference to specific branch LANs through subnets associated with those branch LANs, such as a redistribution cost for subnets associated with the branch LAN of branch gateway 112a. For example, VIG 120a may include a redistribution cost 260a of 10 for subnet 174.28.100.0/24, where devices on SD-WAN 100 with IP addresses between 174.28.100.0 and 174.28.100.255 are located on the branch LAN associated with branch gateway 112a. Similarly, VIG 120b may include a redistribution cost 260b of 15 for subnet 174.28.100.0/24, such that core router 150 and other network infrastructure of core site LAN 170 prefers to route traffic for subnet 174.28.100.0/24 through VIG 120a. VIGs 120, once assigned redistribution costs 260 from network orchestrator 140, may send advertisements to network infrastructure devices of core site LAN 170, including core router 150.

Core router 150 may store VIG costs 290 in memory 220f. In some examples, VIG costs 290 are entries in a larger routing table for devices of the wider network. Core router 150 may, from time to time, receive advertisements from VIG 120a and VIG 120b including redistribution costs 260 for certain subnets. When core router 150 receives a data packet, it may check the routing table including VIG costs 290, and if the data packet has a destination IP address within a subnet of a branch LAN, will forward the data packet through the primary VIG for that branch LAN. For example, if core router 150 receives a packet destined for a device with address 174.28.100.41, the routing table of core router 150 may indicate that there are two next-hops available for that packet. One next hop is to VIG 120a with a cost of 10, and another next hop is to VIG 120b with a cost of 150. Core router 150 may then forward the packet to VIG 120a. VIG 120a may then forward the packet through a secure tunnel to branch gateway 112a.

Figure 3:
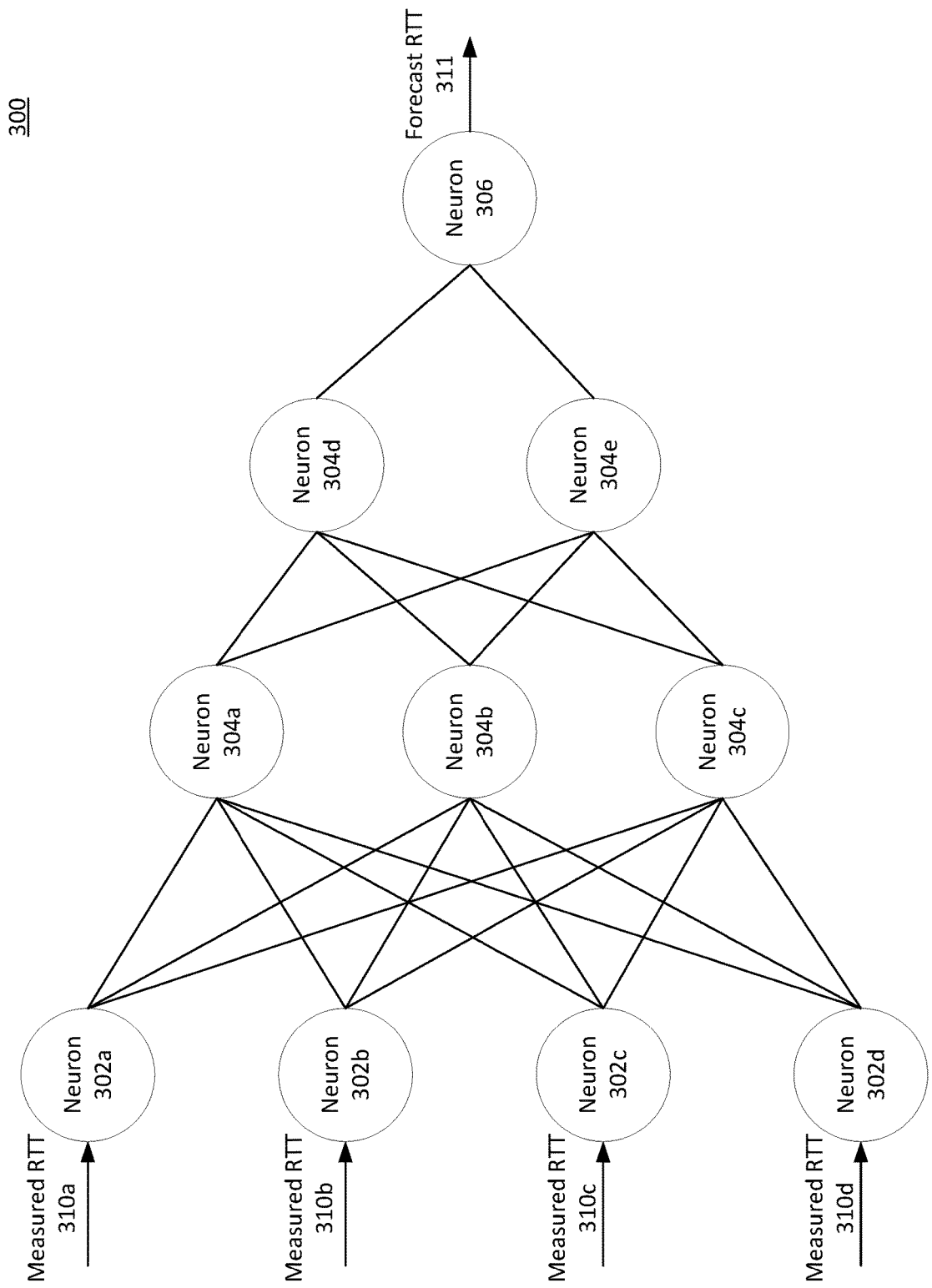
FIG. 3 is a block diagram of a neural network including a roundtrip time time-series input to generate a roundtrip time forecast, according to some embodiments.

FIG. 3 is a block diagram of a neural network 300 including a measured RTT time-series input 310 to generate a forecast RTT value 311, according to some embodiments. The measured RTT values in time-series input 310 are measured by a VIG from diagnostic packets transmitted between the VIG and a BG. In some embodiments, a network orchestrator may retrieve RTT time-series values after a selected period of time, directly from the VIG. In some embodiments, the VIGs collect RTT time-series input 310 over the selected period of time, and then store these values until the RTT time-series input 310 is transmitted to the network orchestrator.

RTT time-series input 310 from a certain VIG may include multiple RTT values corresponding to diagnostic packets sent at different times throughout a time period. For example, measured RTT 310a may be measured at time t, measured RTT 310b may be measured at time t+1, measured RTT 310c may be measured at time t+2, and measured RTT 310d may be measured at time t+3. Measurements may be taken periodically, or triggered by any other event or interrupt. Neurons 302, 304, and 306 may retain information from previous ("historic") RTT time-series inputs 310 to aid the determination of forecast RTT 311. Input neurons 302 receive RTT time-series inputs 310 collected from a certain VIG, and each perform a series of mathematical operations to determine respective outputs that are fed into intermediate neurons 304 as inputs. Similarly, intermediate neurons 304 perform a series of mathematical operations to determine respective outputs that are fed into output neuron 306. Output neuron 306 likewise performs a series of mathematical operations to determine historic RTT values 301 to produce a forecast RTT value 311 for the VIG. Although FIG. 3 illustrates a certain type of neural network that forecasts RTT for a single VIG, this disclosure contemplates any appropriate machine learning algorithm or set of machine learning algorithms to forecast any network health parameter for any number of VIGs. Although the neural network of FIG. 3 illustrates a neural network with forward information flow (input neurons 302 feed into intermediate neurons 304 that feed into output neuron 308), information may flow in any direction between any number of neurons in any configuration. Forecast RTT value 311 is a predicted RTT for a hypothetical diagnostic packet transmitted between the VIG and the branch gateway associated with time-series input 310 in neural network 300, at a certain time.

Figure 4:
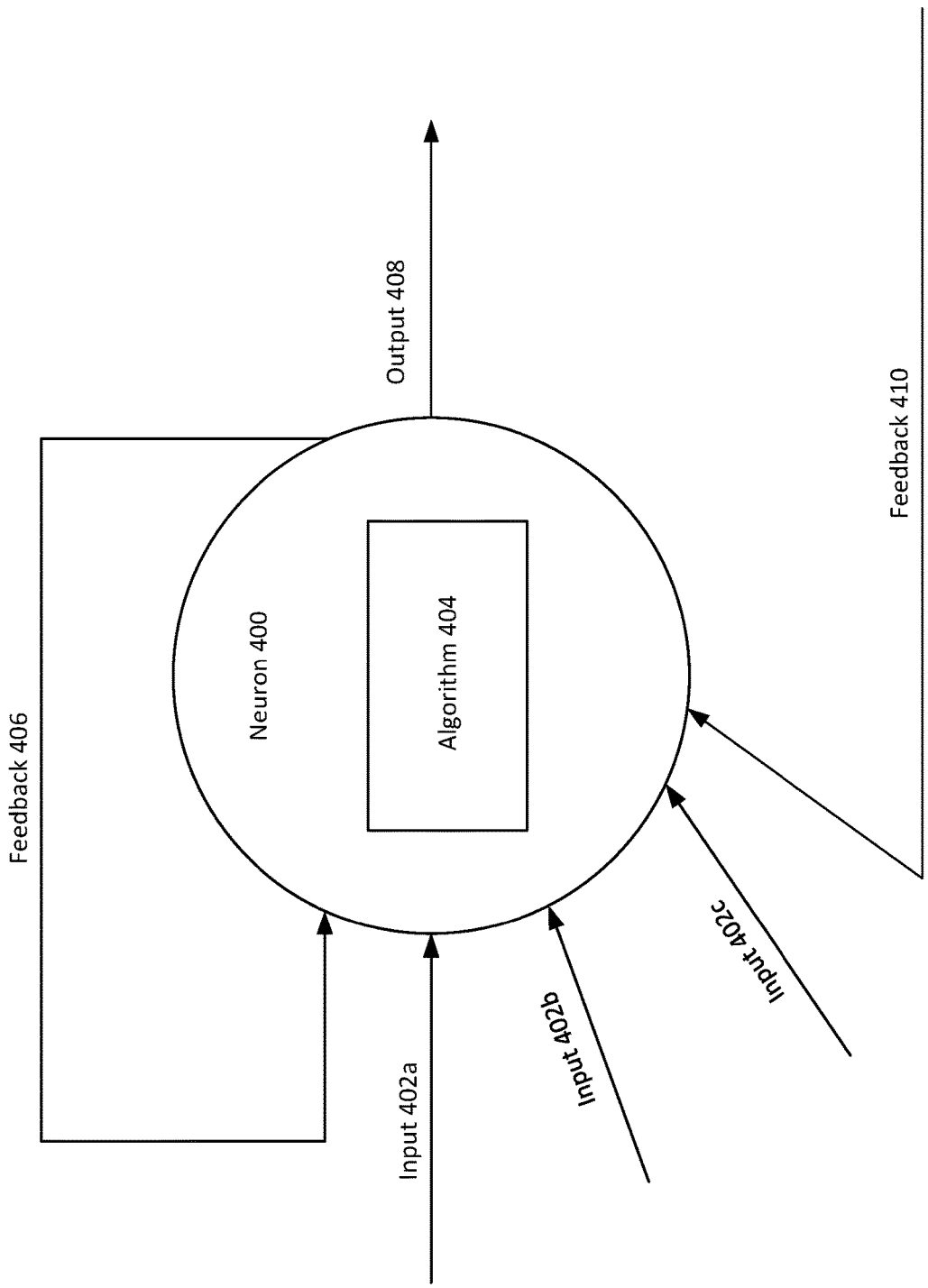
FIG. 4 illustrates a schematic of a neuron for use in a recurrent neural network for forecasting packet roundtrip time values, according to some embodiments.

FIG. 4 illustrates a schematic of neuron 400 of a recurrent neural network (RNN) for forecasting packet roundtrip time values, according to some embodiments. Depending on the specific RNN and the specific location of neuron 400 in the RNN, neuron 400 may receive time-series RTT values as inputs 402, output a forecast RTT value as output 408, both, or neither. A feedback connection 406 feeds an output of algorithm 404 back as an input of neuron 400. The value of feedback connection 406 may, in some examples, be the same value as output 408. In some other examples, the value of feedback connections 406 may be different than output 408. Another feedback connection 410 feeds an output of another neuron (e.g. from a successive layer of the RNN) as an input of neuron 400. In certain examples, output 408 may be fed back to prior neurons 400 of the RNN. For example, output 408 may be an input to a neuron whose output is input 402a of neuron 400.

In some examples, output 408 is calculated by algorithm 404 by combining inputs 402 by a given feedback factor, q. In some embodiments, algorithm 404 in combination with feedback 406 feeds output 408 into algorithm 404 as an input.

Mathematically, RNN calculates the forecast RTT value (RTT (k)) using a nonlinear function, F, of the k−1 time-series RTT values, and a feedback RTT value ($\overline{RTT}$(k)), as follows:

$$RTT(k)=F(RTT(k-1),RTT(k-2),RTT(k-3),\overline{RTT}(k)) \quad (3.1)$$

In some embodiments, the RNN may be implemented as a function: fit_rnn(train data, batch size, epochs, neurons, time steps), wherein the input values are defined as: batch size=Number of data samples in train data; neurons=Number of neurons in neural network model; time steps=Number of past values taken in time series data here timesteps=3; epochs=Number of iterations the model should be trained.

In some embodiments, the steps to form (e.g., "train") RNN may include: i) create input, output data (first 3 values in each array is input, 4th value is output); ii) reshape the input data to three-dimensional data (3D); iii) create sequential model; iv) add a hidden layer of RNN with long short term memory (LSTM) Neurons=20, Activation-function=Tan h, batch input shape=(batch size, timesteps, 1); v) add an output layer using a Dense Function (e.g., Dense layer) which outputs the predicted RTT; vi) for feedback the error and optimize the neural network layer use loss-function=mean squared error, optimizer add loop n_epochs (iterations) and fit the model and reset the states in each iteration.

In some examples, neuron 400 may be a recurrent neuron including two layers, a recurrent layer and a linear layer. The recurrent layer (e.g., with a tan-sigmoid transform) may include the following operations to form a hidden layer output 408, RT(t), defined as:

$$RT(t)=\text{tansig}(\Sigma_{j=0}^{N}(IW_{k\_j} \times RTT(k-j))+FW_1 \times RTT(t-1)+FW_2 \times RT(t-1)+b_1) \quad (4.1)$$

Wherein RTT(k−j) values are part of the time-series RTT values and are supplied to neuron 400 as N number of inputs 402, and the input weight factors $IW_{k\_j}$ are selected by the RNN for each input 402 based on results of training. A feedback value 406 (RT(t−1)) is fed back from the output of the recurrent neuron 400 as an input and is weighted using feedback weight factor $FW_2$. Another feedback value 410 (RTT(t−1)) from another layer of neuron 400 (e.g. from the output linear layer) is fed back as an input and is weighted using feedback weight factor $FW_1$. The output of the recurrent layer of neuron 400 is further adjusted by a linear bias $b_1$, as shown in Eq.(4.1). The output of the recurrent layer is then forwarded to a linear stage.

The output stage scales and normalizes the output of the recurrent layer (RT(t)) using a linear function, multiplied by a factor $LW_1$ as shown in equation 4.2, to output a forecast roundtrip time (RTT(t))

$$RTT(t)=\text{Linear}(LW_1 \times RT(t)+b_2) \quad (4.2)$$

where $b_2$ is a second bias factor. Hereinafter, equations 4.1 and 4.2 will be collectively referred to as "Eqs. 4."

Figure 5:
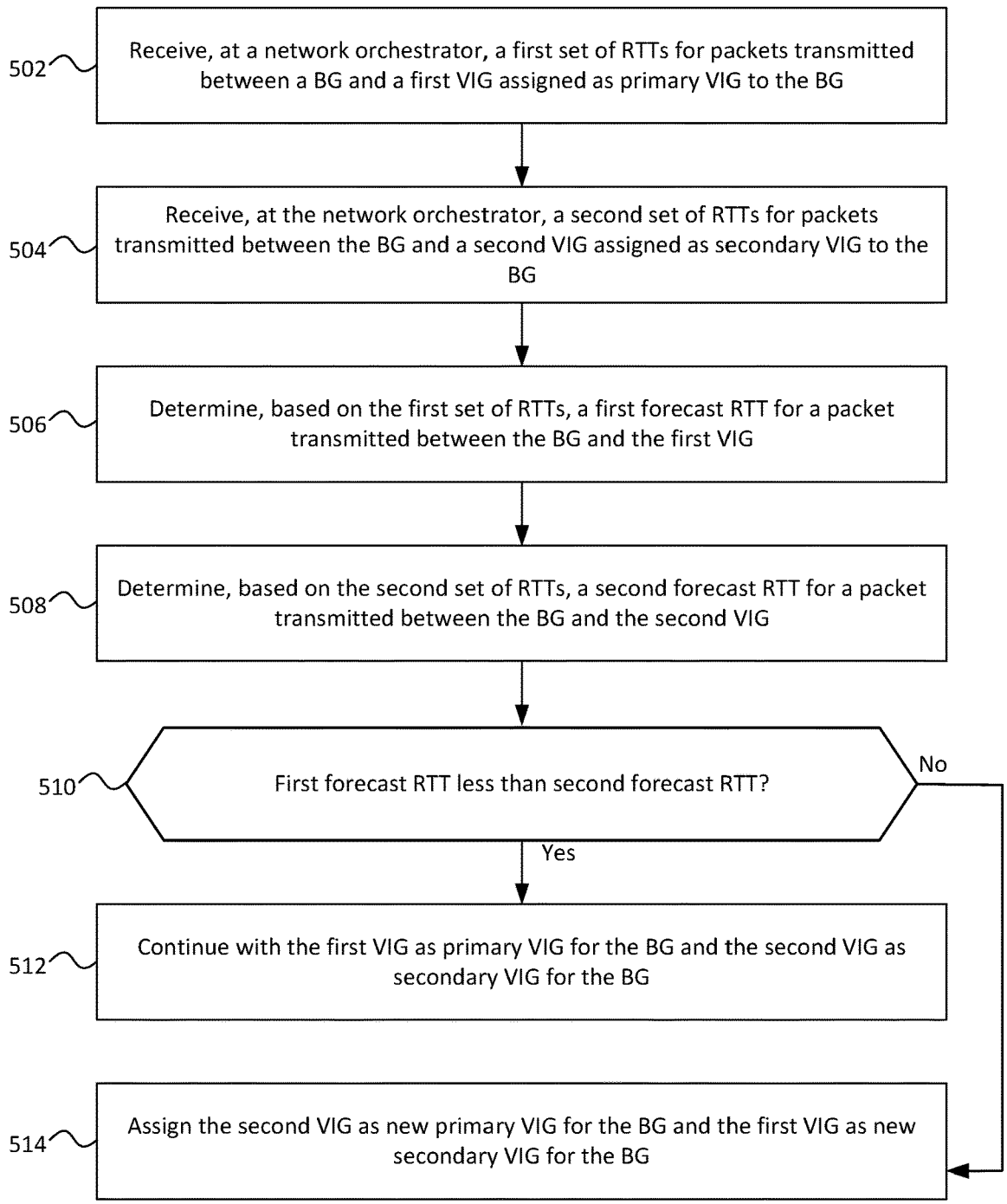
FIG. 5 is a flow chart illustrating steps in a method for providing continuous feedback to an adaptive routing of branch traffic in SDWAN deployments, according to some embodiments.

FIG. 5 is a flow chart illustrating steps in a method 400 for providing continuous feedback adaptively route branch traffic in SDWAN deployments, according to some embodiments. Accordingly, method 500 may include steps performed in an SDWAN deployment as disclosed herein. In embodiments consistent with method 500, at least one or more steps may be performed by a processor in a branch office controller, a virtual internet gateway (VIG), a network orchestrator such as a SDWAN branch orchestrator (SBO), or a backbone router. To perform the blocks in method 500, the processors may execute instructions stored in memory circuits (e.g., any one of memories 220). Further, at least some of the blocks in method 500 may include storing data (e.g., historical information such as RTT values and the like) in a database.

Methods consistent with method 500 may include at least one of the blocks listed below, executed in any order. For example, embodiments consistent with the present disclosure may include one or more of the blocks in method 500 performed in a different order, in parallel, overlapping in time, or almost simultaneously.

In block 502, a first set of roundtrip times (RTTs) is received at a network orchestrator. The first set of RTTs correspond to packets transmitted between a branch gateway (BG) and a first virtual internet gateway (VIG) of a SD-WAN. The first VIG is assigned to the BG as primary VIG. The first set of RTTs may correspond to diagnostic packets periodically sent between BG and first VIG to determine the link health for a secure tunnel through the Internet connecting the BG and the first VIG. In some examples, the network orchestrator may receive additional RTTs of the first set on a periodic basis as additional diagnostic packets are transmitted between BG and the first VIG.

In block 504, a second set of RTTs is received at the network orchestrator. The second set of RTTs correspond to packets transmitted between the BG and a second VIG of the SD-WAN. The second VIG is assigned to the BG as secondary VIG. The second set of RTTs may correspond to diagnostic packets periodically sent between BG and second VIG to determine the link health for a secure tunnel through the Internet connecting the BG and the second VIG. In some examples, the network orchestrator may receive additional RTTs of the second set on a periodic basis as additional diagnostic packets are transmitted between BG and the second VIG.

In block 506, a first forecast RTT is determined based on the first set of RTTs for a packet transmitted between the BG and the first VIG. The packet is a hypothetical packet to be transmitted at a future time. In some examples, the first forecast RTT is a prediction, using a machine learning algorithm as to future network conditions between the BG and the first VIG. In certain examples, the machine learning algorithm eventually receives a measured RTT for the time that the first forecast RTT predicted the network conditions, and the machine learning algorithm may alter itself by comparing the first forecast RTT to the corresponding measured RTT.

In block 508, a second forecast RTT is determined based on the second set of RTTs for a packet transmitted between the BG and the second VIG. The packet is a hypothetical packet to be transmitted at a future time. In some examples, the second forecast RTT is a prediction, using a machine learning algorithm as to future network conditions between the BG and the second VIG. In certain examples, the machine learning algorithm eventually receives a measured RTT for the time that the second forecast RTT predicted the network conditions, and the machine learning algorithm may alter itself by comparing the second forecast RTT to the corresponding measured RTT.

In block 510, the network orchestrator determines whether the first forecast RTT is less than the second forecast RTT. In some examples, if a skew of active branches between the first VIG and the second VIG is not within a predetermined threshold, the network orchestrator assigns the VIG with fewer active branches as primary VIG of the BG. If the first forecast RTT is less than the second forecast RTT, then the network conditions between the first VIG and the BG are likely superior to the network conditions between the second VIG and the BG. In such cases, method 500 proceeds to block 512. If the first forecast RTT is greater than the second forecast RTT, then the network conditions between the first VIG and the BG are likely inferior to the network conditions between the second VIG and the BG. In such cases, method 500 proceeds to block 514.

In block 512, the first VIG is retained as primary VIG for the BG because the network conditions between the first VIG and the BG are likely superior to the network conditions between the second VIG and the BG.

In block 514, the second VIG is assigned as primary VIG for the BG because the network conditions between the second VIG and the BG are likely superior to the network conditions between the first VIG and the BG. In some examples, the second forecast RTT may be required to be less than the first forecast RTT by a certain amount (e.g. 25%) before method 500 reassigns primary VIG in order to reduce bounce between two similarly conditioned network links.

Figure 6:
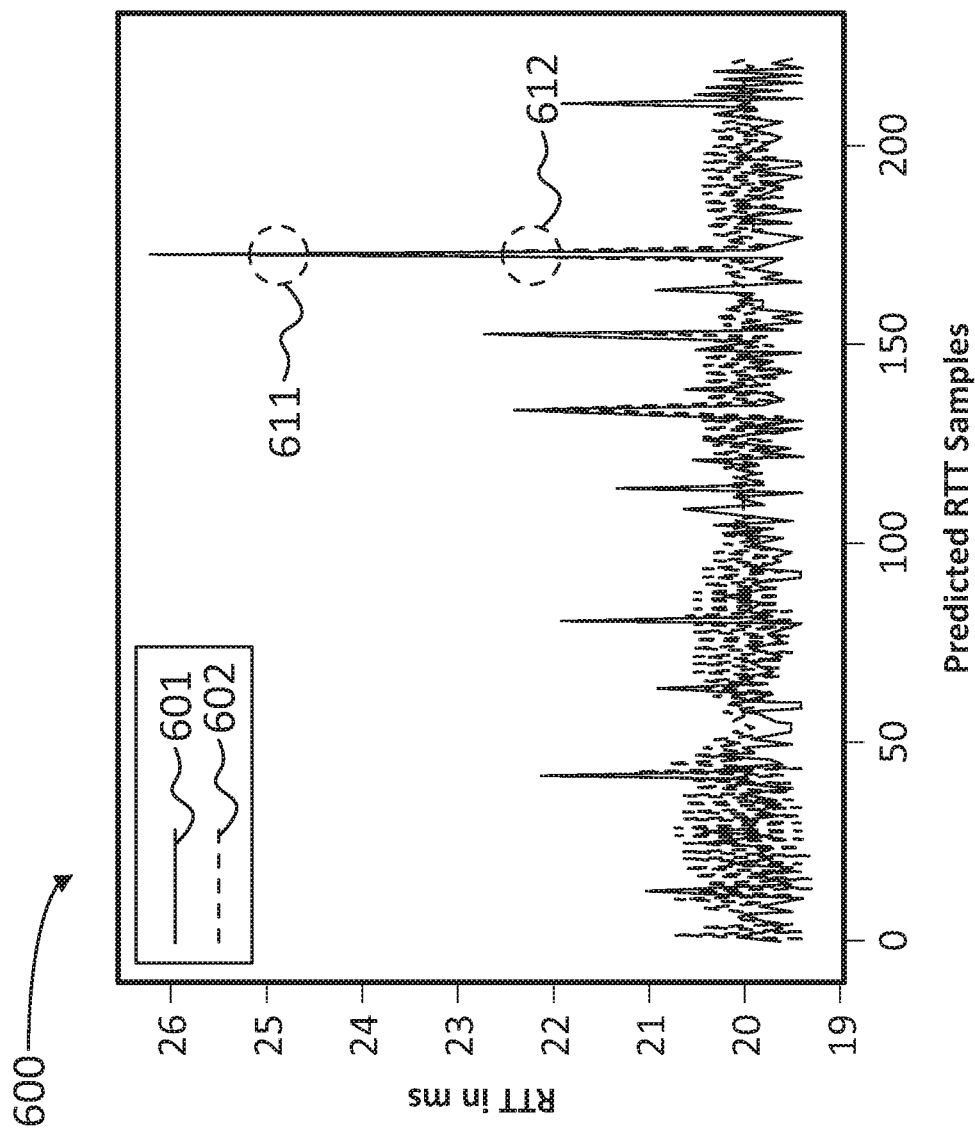
FIG. 6 is a chart illustrating multiple predicted roundtrip time values and actual roundtrip time values, according to some embodiments.

FIG. 6 is a chart 600 illustrating multiple forecast RTT values 602 and actual RTT values 601, according to some embodiments. For chart 600, a network architecture as disclosed herein (e.g., SD-WAN 100) collected 1000 samples (RTT values for as many diagnostic packets) in intervals of 5 seconds. The RNN was trained with a set of 750 data samples (e.g., N=750 in Eqs. 4), leaving 250 samples for test data in chart 600. Chart 600 shows a difference between actual RTT values 601 and predicted RTT values 602, leading to a root-mean-square-standard error (RMSE) of about 0.026 (2.6%). Accordingly, an accuracy of 97.4% is achieved. The accuracy of the model may be increased as desired by increasing the relative size of the training data set relative to the sampling data set. For example, an actual peak RTT 611 has been accurately forecasted by forecast RTT peak 612 (e.g., as for the time of occurrence, rather than exact value).

Figure 7:
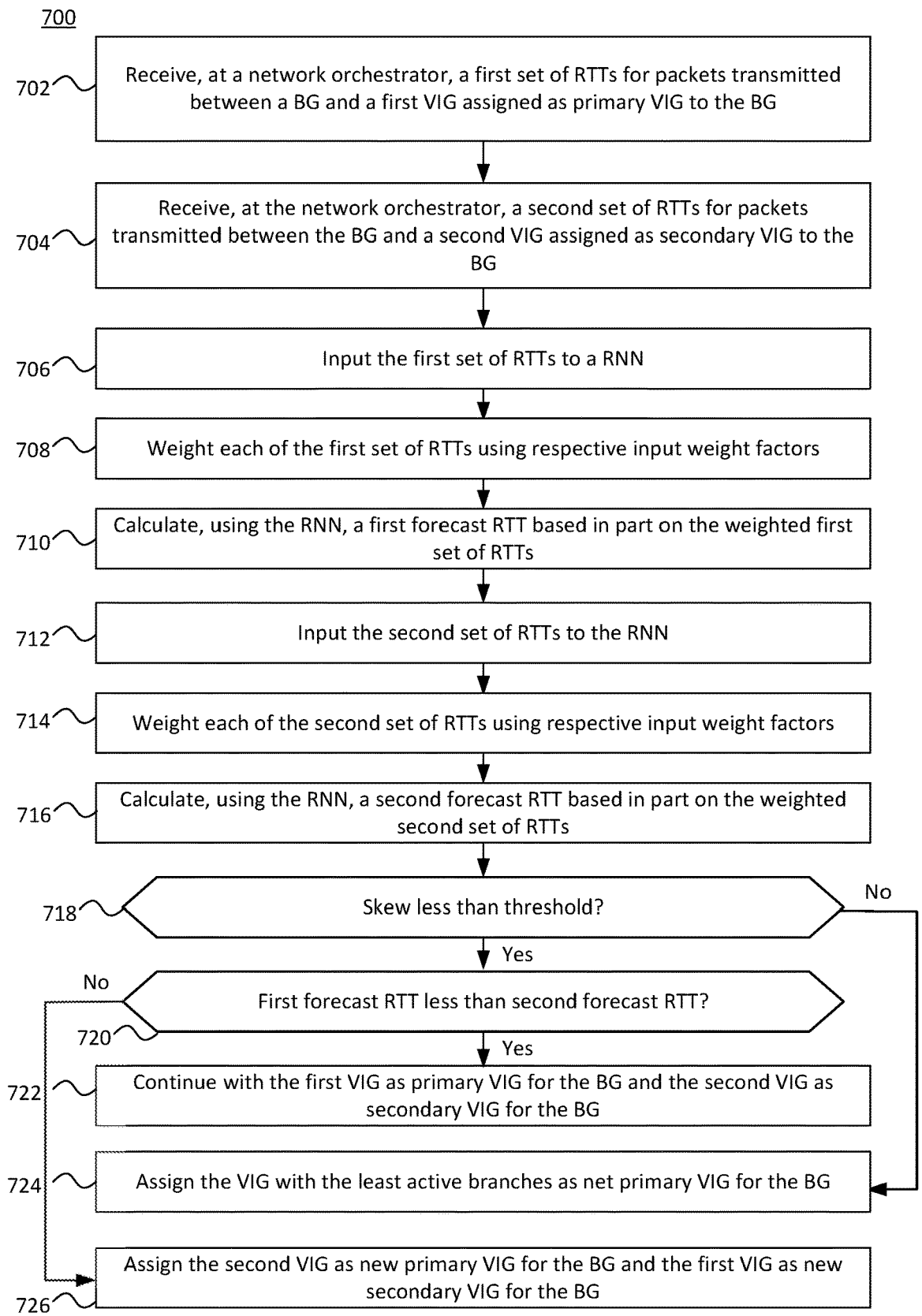
FIG. 7 is a flow chart illustrating steps in a method for monitoring and updating an adapting routing of branch traffic in SDWAN deployments, according to some embodiments.

FIG. 7 is a flow chart illustrating blocks in a method 700 for monitoring and updating an adapting routing of branch traffic in SDWAN deployments, according to some embodiments. Accordingly, method 700 may include steps performed in an SDWAN deployment as disclosed herein. In embodiments consistent with method 700, at least one or more steps may be performed by a processor in a branch office controller, a virtual internet gateway (VIG), a network orchestrator such as a SDWAN branch orchestrator (SBO), or a backbone router. To perform the blocks in method 700, the processors may execute instructions stored in memory circuits (e.g., any one of memories 220). Further, at least some of the blocks in method 700 may include storing data (e.g., historical information such as RTT values and the like) in a database.

Methods consistent with method 700 may include at least one of the blocks listed below, executed in any order. For example, embodiments consistent with the present disclosure may include one or more of the blocks in method 700 performed in a different order, in parallel, overlapping in time, or almost simultaneously.

In block 702, a first set of roundtrip times (RTTs) is received at a network orchestrator. The first set of RTTs correspond to packets transmitted between a branch gateway (BG) and a first virtual interne gateway (VIG) of a SD-WAN. The first VIG is assigned to the BG as primary VIG. The first set of RTTs may correspond to diagnostic packets periodically sent between BG and first VIG to determine the link health for a secure tunnel through the Internet connecting the BG and the first VIG. In some examples, the network orchestrator may receive additional RTTs of the first set on a periodic basis as additional diagnostic packets are transmitted between BG and the first VIG.

In block 704, a second set of RTTs is received at the network orchestrator. The second set of RTTs correspond to packets transmitted between the BG and a second VIG of the SD-WAN. The second VIG is assigned to the BG as secondary VIG. The second set of RTTs may correspond to diagnostic packets periodically sent between BG and second VIG to determine the link health for a secure tunnel through the Internet connecting the BG and the second VIG. In some examples, the network orchestrator may receive additional RTTs of the second set on a periodic basis as additional diagnostic packets are transmitted between BG and the second VIG.

In block 706, the first set of RTTs is input into a recurrent neural network (RNN). In some examples, each of the first set of RTTs is input into a different input neuron of the RNN. In some other examples, multiple of the first set of RTTs is input into each input neuron of the RNN.

In block 708, each of the first set of RTTs is weighted according to a respective input weight factor. The input weight factors may be adjusted by the RNN based on training of the RNN using training data and measured RTT data that corresponds to respective forecast data. For example, if the RNN determines that more recent RTTs are more important in determining a forecast future RTT, the input weights for the more recent RTTs of the first set may be larger than the input weights for older RTTs.

In block 710, the RNN calculates the first forecast RTT is determined based in part on the weighted first set of RTTs. In some examples, neurons of the RNN weight inputs and generate outputs which are normalized and input into other neurons. This may be a "forward" process (e.g. information passes from input neurons through successive layers of intermediate neurons to finish in output neurons) and it may also be a "feedback" process (e.g. information passes from the successive layers of neurons to predecessor layers of neurons). The overall output of the RNN is the first forecast RTT for a certain future time.

In block 712, the second set of RTTs is input into the RNN. In some examples, each of the second set of RTTs is input into a different input neuron of the RNN. In some other examples, multiple of the second set of RTTs is input into each input neuron of the RNN.

In block 714, each of the second set of RTTs is weighted according to a respective input weight factor. The input weight factors may be adjusted by the RNN based on training of the RNN using training data and measured RTT data that corresponds to respective forecast data. For example, if the RNN determines that more recent RTTs are more important in determining a forecast future RTT, the input weights for the more recent RTTs of the first set may be larger than the input weights for older RTTs.

In block 716, the RNN calculates the second forecast RTT is determined based in part on the weighted second set of RTTs. In some examples, neurons of the RNN weight inputs and generate outputs which are normalized and input into other neurons. This may be a "forward" process (e.g. information passes from input neurons through successive layers of intermediate neurons to finish in output neurons) and it may also be a "feedback" process (e.g. information passes from the successive layers of neurons to predecessor layers of neurons). The overall output of the RNN is the second forecast RTT for a certain future time.

In block 718, the network orchestrator determines whether a skew of active branches is less than a predetermined threshold. If the skew is less, then method 700 proceeds to block 720. If the skew is not less, then method 700 proceeds to block 724 to assign the least loaded VIG to the BG as primary VIG.

In block 720, the network orchestrator determines whether the first forecast RTT is less than the second forecast RTT. If the first forecast RTT is less than the second forecast RTT, then the network conditions between the first VIG and the BG are likely superior to the network conditions between the second VIG and the BG. In such cases, method 700 proceeds to block 722. If the first forecast RTT is greater than the second forecast RTT, then the network conditions between the first VIG and the BG are likely inferior to the network conditions between the second VIG and the BG. In such cases, method 700 proceeds to block 724.

In block 722, the first VIG is retained as primary VIG for the BG because the network conditions between the first VIG and the BG are likely superior to the network conditions between the second VIG and the BG. Similarly, the second VIG is retained as secondary VIG for the BG.

In block 724, the second VIG is assigned as primary VIG for the BG because the network conditions between the second VIG and the BG are likely superior to the network conditions between the first VIG and the BG. In some examples, the second forecast RTT may be required to be less than the first forecast RTT by a certain amount (e.g. 25%) before method 700 reassigns primary VIG in order to reduce bounce between two similarly conditioned network links.

Hardware Overview

FIG. 8 is a block diagram illustrating an example computer system 800 with which the network orchestrator 140 of FIG. 1 and the method of FIGS. 5 and 7 can be implemented. In certain aspects, the computer system 800 may be implemented using hardware or a combination of software and hardware, either in a dedicated network device, or integrated into another entity, or distributed across multiple entities.

Computer system 800 includes a bus 808 or other communication mechanism for communicating information, and a processor 802 coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, e.g., one or more modules of computer program instructions encoded on a computer-readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB hubs, PCI hubs, etc. The input/output module 810 is configured to connect to a communications module 812. Exemplary communications modules 812 include networking interface cards, such as Ethernet cards and modems. In certain aspects, input/output module 810 is configured to connect to a plurality of devices, such as an input device 814 and/or an output device 816. Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as an LCD (liquid crystal display) monitor, for displaying information to the user.

Network orchestrator 140 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data network device, or that includes a middleware component, e.g., an application network device, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and network devices. A client and network device are generally remote from each other and typically interact through a communication network. The relationship of client and network device arises by virtue of computer programs running on the respective computers and having a client-network device relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires forming bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   receiving, at a network orchestrator, a first set of roundtrip times (RTTs) for a first set of diagnostic packets transmitted between a branch gateway (BG) and a first virtual internet gateway (VIG) assigned as a primary VIG to the BG in a software-defined network (SDN);
   receiving, at the network orchestrator, a second set of RTTs for a second set of diagnostic packets transmitted between the BG and a second VIG assigned as a secondary VIG to the BG in the SDN;
   determining, based on the first set of RTTs, a first forecast RTT for a packet between the BG and the first VIG by inputting the first set of RTTs to a recurrent neural network (RNN) and receiving the first forecast RTT as an output from the RNN;
   determining, based on the second set of RTTs, a second forecast RTT for a packet between the BG and the second VIG; and
   assigning, by the network orchestrator, a new primary VIG to the BG in the SDN based on the first forecast RTT and the second forecast RTT.

2. The computer-implemented method of claim 1, wherein receiving the first forecast RTT as an output from the RNN further comprises:
   weighting each of the first set of RTTs using respective input weight factors; and
   determining, by the RNN, the first forecast RTT based in part on the weighted first set of RTTs.

3. The computer-implemented method of claim 2, wherein calculating the first forecast RTT comprises:
   transmitting outputs of a set of input neurons of the RNN to a set of intermediate neurons of the RNN;
   transmitting outputs of the set of intermediate neurons to a set of output neurons of the RNN; and
   outputting the first forecast RTT from the set of output neurons.

4. The computer-implemented method of claim 3, wherein the first forecast RTT is fed back into at least one of: an input neuron of the set of input neurons and an intermediate neuron of the set of intermediate neurons.

5. The computer-implemented method of claim 2, wherein the RNN is trained by comparing the first and second forecast RTTs to first and second measured RTTs, respectively.

6. The computer-implemented method of claim 1, wherein determining the second forecast RTT comprises:
   inputting the second set of RTTs to the RNN;
   weighting each of the second set of RTTs using respective input weight factors; and
   calculating, by the RNN, the second forecast RTT based in part on the weighted second set of RTTs.

7. The computer-implemented method of claim 1, wherein the new primary VIG is selected further based on a skew of active branches between the first VIG and the second VIG.

8. The computer-implemented method of claim 1, further comprising:
   receiving, at the network orchestrator, a third set of RTTs for a third set of diagnostic packets transmitted between a second BG and the second VIG, which is assigned as a primary VIG to the second BG in the SDN;
   receiving, at the network orchestrator, a fourth set of RTTs for a fourth set of diagnostic packets transmitted between the second BG and the first VIG, which is assigned as a secondary VIG to the second BG in the SDN;
   determining, based on the third set of RTTs, a third forecast RTT for a packet between the second BG and the second VIG;
   determining, based on the fourth set of RTTs, a fourth forecast RTT for a packet between the second BG and the first VIG; and
   assigning, by the network orchestrator, a new primary VIG to the second BG in the SDN based on the third forecast RTT and the fourth forecast RTT.

9. The computer-implemented method of claim 1, wherein assigning the new primary VIG to the BG further comprises sending routing updates to the first VIG and the second VIG such that sending traffic through the assigned new primary VIG becomes preferable.

10. The computer-implemented method of claim 1, further comprising assigning a secondary VIG to the BG in the SDN, and engaging the secondary VIG when a connectivity status of the primary VIG to the BG is lost.

11. A network orchestrator, comprising:
a memory storing instructions; and
one or more processors configured to execute the instructions to cause the network orchestrator to:
receive a first set of roundtrip times (RTTs) for a first set of diagnostic packets transmitted between a branch gateway (BG) and a first virtual internet gateway (VIG) assigned as a primary VIG to the BG in a software-defined network (SDN);
receive a second set of RTTs for a second set of diagnostic packets transmitted between the BG and a second VIG assigned as a secondary VIG to the BG in the SDN;
input the first set of RTTs into a machine learning algorithm;
determine a first forecast RTT for a packet between the BG and the first VIG by inputting the first set of RTTs to a recurrent neural network (RNN) and receiving the first forecast RTT as an output from the RNN;
determine a second forecast RTT for a packet between the BG and the second VIG; and
assign a new primary VIG to the BG in the SDN based on the first forecast RTT and the second forecast RTT.

12. The network orchestrator of claim 11, wherein receiving the first forecast RTT as an output from the RNN further comprises weighting each of the first set of RTTs using respective input weight factors and determining the first forecast RTT based in part on the weighted first set of RTTs.

13. The network orchestrator of claim 12, wherein the RNN is trained by comparing the first and second forecast RTTs to first and second measured RTTs, respectively.

14. The network orchestrator of claim 11, wherein the one or more processors further cause the network orchestrator to send routing updates to the first VIG and the second VIG such that sending traffic through the new primary VIG becomes preferable.

15. The network orchestrator of claim 14, wherein the routing updates are open shortest path first (OSPF) updates for an OSPF network.

16. The network orchestrator of claim 11, wherein the network orchestrator is executed on a cloud device coupled to the BG and the first and second VIGs via the Internet.

17. A non-transitory machine-readable storage medium storing instructions that, if executed by a physical processing element of a network orchestrator, cause the network orchestrator to perform a method, the method comprising:
receiving, at the network orchestrator, a first set of roundtrip times (RTTs) for a first diagnostic packets transmitted between a branch gateway (BG) and a first virtual internet gateway (VIG) assigned as a primary VIG to the BG in a software-defined network (SDN);
receiving, at the network orchestrator, a second set of RTTs for a second set of diagnostic packets transmitted between the BG and the second VIG assigned as a secondary VIG to the BG in the SDN;
determining, based on the first set of RTTs, a first forecast RTT for a packet between the BG and the first VIG by inputting the first set of RTTs to a recurrent neural network (RNN) and receiving the first forecast RTT as an output from the RNN;
determining, based on the second set of RTTs, a second forecast RTT for a packet between the BG and the second VIG; and
assigning a new primary VIG to the BG in the SDN based on the first forecast RTT and the second forecast RTT.

18. The non-transitory machine-readable storage medium of claim 17, wherein the first set of RTTs is received from the first VIG and the second set of RTTs is received from the second VIG.

19. The non-transitory machine-readable storage medium of claim 17, wherein receiving the first forecast RTT as an output from the RNN further comprises weighting each of the first set of RTTs using respective input weight factors and determining the first forecast RTT based in part on the weighted first set of RTTs.

20. The non-transitory machine-readable storage medium of claim 19, wherein the RNN is trained by comparing the first and second forecast RTTs to first and second measured RTTs, respectively.

* * * * *